(12) United States Patent
Reno et al.

(10) Patent No.: US 10,703,403 B2
(45) Date of Patent: Jul. 7, 2020

(54) ENERGY ABSORPTION STRAP ASSEMBLY FOR STEERING COLUMN

(71) Applicant: STEERING SOLUTIONS IP HOLDING CORPORATION, Saginaw, MI (US)

(72) Inventors: Tyler M. Reno, Frankenmuth, MI (US); Donald A. Buzzard, Saginaw, MI (US); Michael P. Anspaugh, Bay City, MI (US); Randy Jones, North Branch, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 184 days.

(21) Appl. No.: 15/845,535

(22) Filed: Dec. 18, 2017

(65) Prior Publication Data

US 2019/0185046 A1 Jun. 20, 2019

(51) Int. Cl.
*B62D 1/19* (2006.01)
*B62D 1/184* (2006.01)
*F16F 7/12* (2006.01)

(52) U.S. Cl.
CPC ............ *B62D 1/195* (2013.01); *B62D 1/184* (2013.01); *B62D 1/192* (2013.01); *F16F 7/123* (2013.01); *F16F 7/128* (2013.01)

(58) Field of Classification Search
CPC .......... B62D 1/195; B62D 1/192; B62D 1/19; B62D 1/184; B62D 1/189; B62D 1/187; B62D 1/18; F16F 7/123; F16F 7/128; F16F 7/12
USPC ............ 74/493, 492; 280/777, 775; 188/371
See application file for complete search history.

(56) References Cited

U.S. PATENT DOCUMENTS

| 4,901,592 A * | 2/1990 | Ito .......................... B62D 1/195 188/371 |
| 2015/0096404 A1* | 4/2015 | Martinez ................ B62D 1/195 74/492 |

* cited by examiner

*Primary Examiner* — Keith J Frisby
(74) *Attorney, Agent, or Firm* — Dickinson Wright PLLC

(57) ABSTRACT

A steering column assembly includes a lower jacket assembly extending along a steering column axis. Also included is an upper jacket assembly at least partially received within the lower jacket assembly, the upper jacket assembly translatable along the steering column axis relative to the lower jacket assembly. Further included is an energy absorption strap operatively coupled to the upper jacket, the energy absorption strap having an aperture defined therein. Yet further included is a rake bolt extending through the lower jacket and through the aperture of the energy absorption strap.

14 Claims, 3 Drawing Sheets

ENERGY ABSORPTION STRAP ASSEMBLY FOR STEERING COLUMN

BACKGROUND OF THE INVENTION

The embodiments disclosed herein relate to an energy absorption strap for a steering column.

Telescopically adjustable steering columns generally include a telescope actuator and column jacket having lower and upper jackets. The column jacket is longitudinally moveable and internally collapsible along a longitudinal axis between a "full out" position in which the column jacket is fully extended and a "full in" position in which the column jacket is fully retracted. This collapsibility is energy-absorbing (E/A) and may be beneficial during a vehicle impact event.

Some steering column applications have requirements associated with reduced packaging space. However, many steering columns require larger rake levers and/or numerous other parts that surround the rake lever to actuate the many working components. One such component is lever arm extension that is typically attached to the rake lever that is required to move an eccentric cam out of the telescoping path to allow the upper jacket to move while the column is unlocked. Typically, these parts add cost and weight to the system, as well as a degree of complexity.

SUMMARY OF THE INVENTION

According to one aspect of the disclosure, a steering column assembly includes a lower jacket assembly extending along a steering column axis. Also included is an upper jacket assembly at least partially received within the lower jacket assembly, the upper jacket assembly translatable along the steering column axis relative to the lower jacket assembly. Further included is an energy absorption strap operatively coupled to the upper jacket, the energy absorption strap having an aperture defined therein. Yet further included is a rake bolt extending through the lower jacket and through the aperture of the energy absorption strap.

According to another aspect of the disclosure, an energy absorption strap assembly for a steering column includes a rake bolt. Also included is an energy absorption strap having an elongated slot defined by a slot wall, a centerline axis of the rake bolt intersecting with the elongated slot.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated is a steering column assembly having an energy absorption strap assembly that accommodates telescoping movement of the steering column assembly, while reducing weight and packaging of the overall steering column assembly.

Figure 1:
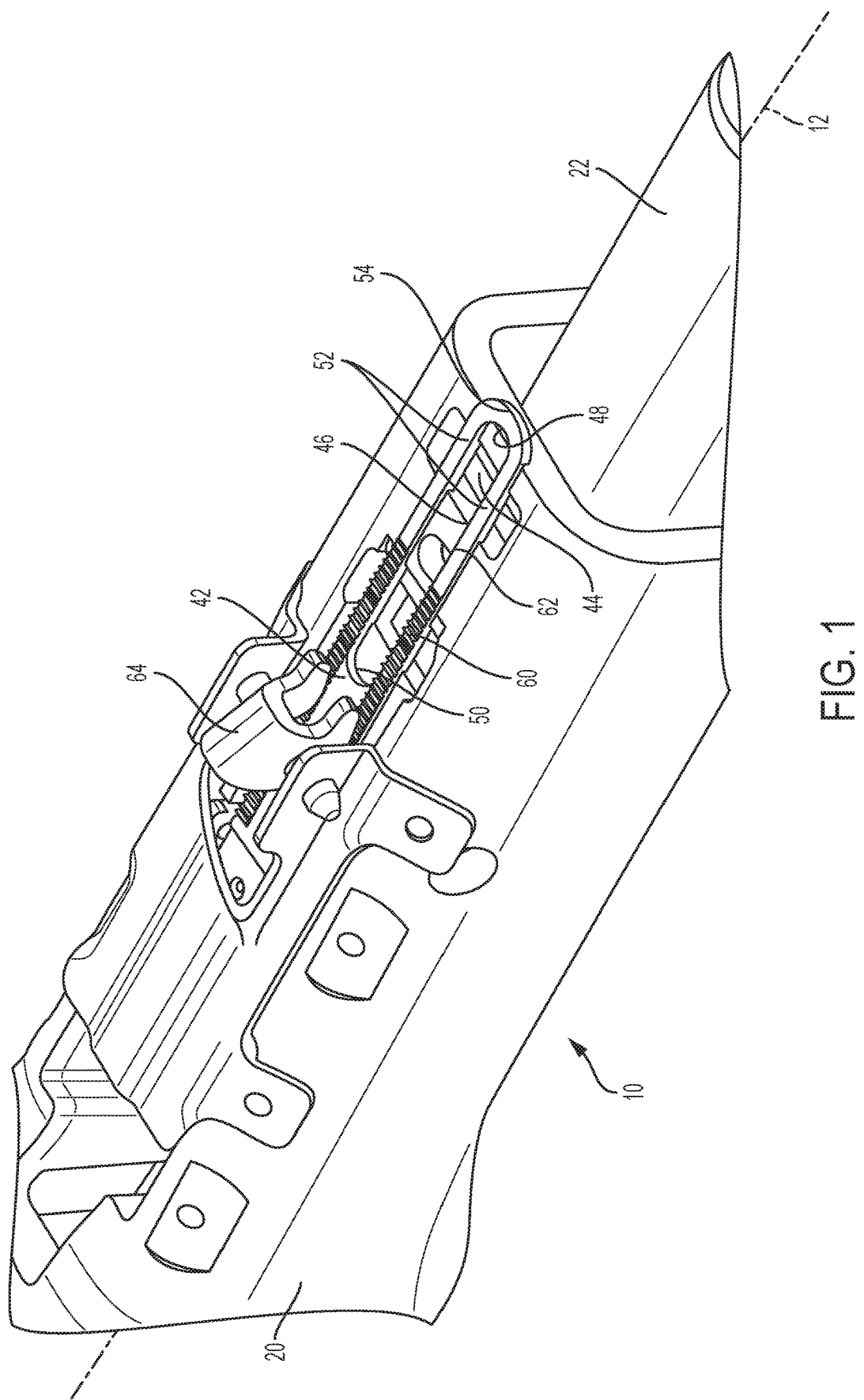
FIG. 1 is a first perspective view of an energy absorption strap assembly of a steering column assembly.

Referring to FIG. 1, a steering column assembly 10 is shown. The steering column assembly 10 extends along a steering column axis 12. The steering column assembly 10 is an adjustable telescopic steering column assembly. A steering shaft (not shown) extends through the steering column assembly 10 along the steering column axis 12. The steering column assembly 10 includes a lower jacket assembly 20 and an upper jacket assembly 22.

The upper jacket assembly 22 extends longitudinally along the steering column axis 12. The upper jacket assembly 22 is telescopically or slidably received within the lower jacket assembly 20. The upper jacket assembly 22 is translatable along the steering column axis 12 with respect to the lower jacket assembly 20. The lower jacket assembly 20 extends along the steering column axis 12. In this configuration, the lower jacket assembly 20 defines an inner bore that slidably or telescopically receives at least a portion of the upper jacket assembly 22. It is also possible that this configuration can be inverted with the upper jacket 22 defining an inner bore that slidably or telescopically envelops (partially or fully) the lower jacket 20.

Figure 2:
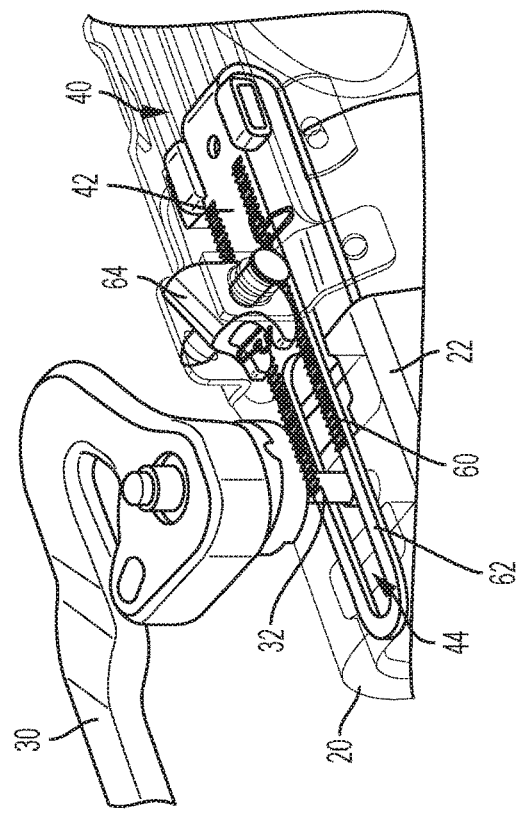
FIG. 2 is a second perspective view of the energy absorption strap assembly.

Referring now to FIG. 2, a rake lever 30 operatively coupled to the lower jacket 20 and the upper jacket 22 with a rake bolt 32. The rake lever 30 facilitates configured adjustment of the pitch or rake of the lower jacket assembly 20 and the upper jacket assembly 22. The rake bolt 32 extends through the lower 20 and secures or releases the upper jacket 22.

Figure 3:
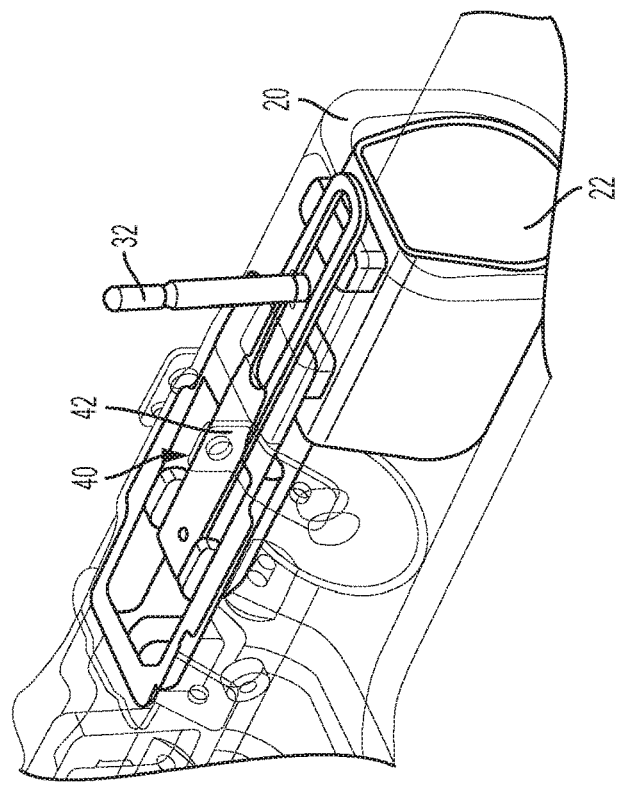
FIG. 3 is a perspective view of the energy absorption strap assembly according to another aspect of the disclosure.

FIGS. 1-3 illustrate an energy absorption assembly 40 extending between the lower jacket assembly 20 and the upper jacket assembly 22. The energy absorption assembly 40 translates with upper jacket assembly 22 during telescoping movement of the upper jacket 22 during adjustment of the position of the upper jacket assembly 22 relative to the lower jacket assembly 20. The energy absorption assembly 40 is configured to provide a drag load or force opposing stroking or translation of the upper jacket assembly 22 relative to the lower jacket assembly 20 to decelerate the steering column assembly 10 during a collapse event, such as a vehicle crash, for example. The drag load or force opposing stroking of the upper jacket assembly 22, relative to the lower jacket assembly 20, may be adaptive or variable based on the loads encountered during the collapse event and the configuration of the energy absorption assembly 40.

The energy absorption assembly 40 includes at least one energy absorption (EA) strap 42, only one being illustrated and described herein. The EA strap 42 is substantially U-shaped in some embodiments. The EA strap 42 is operatively coupled to the upper jacket 22. The EA strap 42 absorbs energy during a collapse event of the steering column. In some embodiments, the energy absorption assembly 40 may be selectively switched between multiple load requirements.

The EA strap 42 includes an aperture 44 defined by a wall 46 at an interior region of the EA strap 42. In the illustrated embodiments, the aperture 44 is an elongated slot that is substantially oval in shape. However, it is to be appreciated that the aperture 44 may be in the form of different shapes, including but not limited to a hole or opening slightly larger than the rake bolt 32. The wall 46 includes a first end wall portion 48, a second end wall portion 50 and a pair of side walls 52 (FIG. 1). While the aperture 44 may be located at alternative positions along the EA strap 42, the illustrated embodiment shows the aperture 44 being located proximate an end 54 of the EA strap 42. In particular, the first end wall portion 48 is located proximate the end 54 of the EA strap 42.

The aperture 44 of the EA strap 42 may be various contemplated lengths in a longitudinal direction of the EA strap depending upon the particular application, as will be appreciated from the description herein. Regardless of the precise length of the aperture 44, the aperture 44 is positioned to receive the rake bolt 32 therethrough. In particular, the rake bolt 32 extends through the lower jacket 20, the upper jacket 22 and the aperture 44. As the upper jacket 22 telescopes within the lower jacket 20, the relationship between the rake bolt 32 and the wall 46 of the aperture 44 defines fore and aft translation limits of the upper jacket 22. Specifically, the first end wall portion 48 defines a first translation limit ("full telescope in") of the upper jacket 22 and the second end wall portion 50 ("full telescope out") defines a second translation limit of the upper jacket 22. As the EA strap 42 translates with the upper jacket 22, contact between the rake bolt 32 and one of the respective end walls (48,50) limits the translation of the upper jacket 22.

Figure 4:
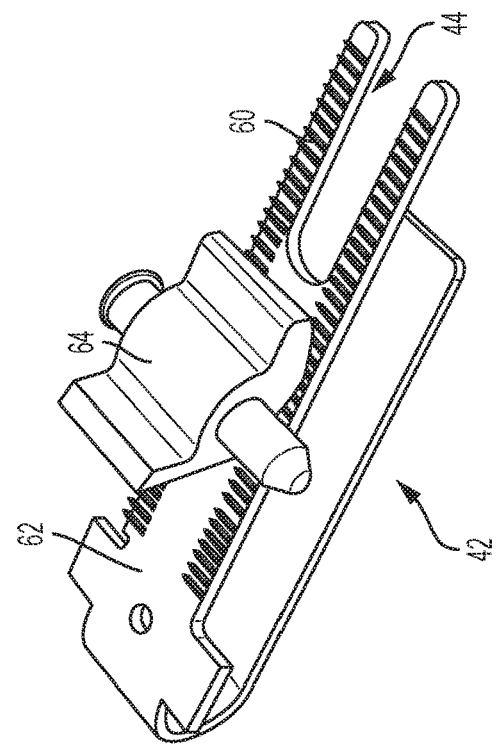
FIG. 4 is a perspective view of an energy absorption strap of the energy absorption strap assembly according to another aspect of the disclosure.

Referring now to FIGS. 1, 2 and 4, the EA strap 42 is illustrated with a plurality of teeth 60 disposed on at least a portion of a face 62 of the EA strap 42. An eccentric cam 64 is engageable with the plurality of teeth 60 to translationally lock and unlock the EA strap 42. The eccentric cam 64 is actuated by movement of the rake lever 30 with an appendage that operatively connects the rake lever 30 and the eccentric cam 64.

By including the aperture 44 in the EA strap 42, the eccentric cam 64 is located in close proximity to the rake bolt 32 and the rake lever 30, when compared to solid EA straps that do not permit extending the rake bolt 32 therethrough. This is beneficial for steering column applications with stringent packaging requirements. Additionally, the EA strap 42 straddles the rake bolt 32 to eliminate the need to move the EA strap 42 further forward in the vehicle or to the 6 o'clock or 12 o'clock positions on the steering column. Removing the material from the EA strap 42 allows direct connection between the eccentric cam 64 and the rake lever 30, thereby eliminating or reducing the need for extra linkage components required when the components are further apart. The elimination or reduction of such linkage components, as well as the reduced material of the EA strap 42, results in weight and packaging reductions.

Figure 5:
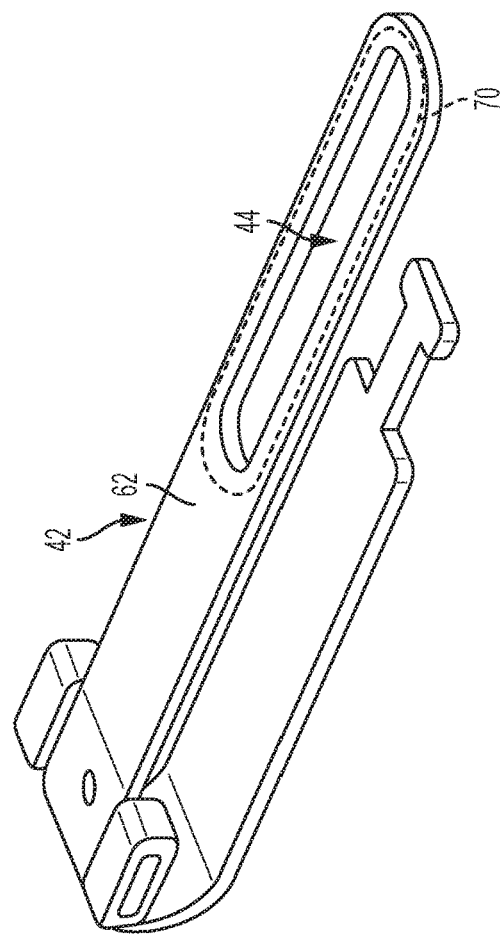
FIG. 5 is a perspective view of the energy absorption strap of the energy absorption strap assembly according to another aspect of the disclosure.

Referring now to FIG. 5, another aspect of the EA strap 42 is shown. In the illustrated embodiment with the EA strap 42 in the clamp path, the eccentric cam 64, and associated components, could be completely eliminated due to a roughened or coated portion 70 of the face 62 of the EA strap 42 that provides sufficient friction to maintain the position of the EA strap 42 while the system is in the locked position. The roughened portion 70 surrounds at least a portion of the aperture 44 in some embodiments. Additional ergonomic telescope holding load and/or a reduction of rake bolt clamp tension is achieved by placing the EA strap 42 in the clamp path.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
a lower jacket extending along a steering column axis;
an upper jacket at least partially received within the lower jacket, the upper jacket translatable along the steering column axis relative to the lower jacket;
an energy absorption strap operatively coupled to the upper jacket, the energy absorption strap having an aperture defined therein, wherein a face of the energy absorption strap includes a plurality of teeth disposed thereon; and
a rake bolt extending through the lower jacket and through the aperture of the energy absorption strap.

2. The steering column assembly of claim 1, wherein the aperture of the energy absorption strap is an elongated slot defined by a first end slot wall, a second end slot wall and a pair of side walls.

3. The steering column assembly of claim 2, wherein the first end slot wall defines a first translation limit of the upper jacket and the second end slot wall defines a second translation limit of the upper jacket.

4. The steering column assembly of claim 1, wherein the aperture of the energy absorption strap is located proximate an end of the energy absorption strap.

5. The steering column assembly of claim 1, wherein the plurality of teeth are only disposed on a portion of the face.

6. The steering column assembly of claim 1, further comprising an eccentric cam selectively engageable with the plurality of teeth.

7. The steering column assembly of claim 1, wherein the aperture is an oval shaped slot.

8. An energy absorption strap assembly for a steering column comprising:
a rake bolt; and
an energy absorption strap having an elongated slot defined by a slot wall, a centerline axis of the rake bolt intersecting with the elongated slot, wherein a face of the energy absorption strap includes a plurality of teeth disposed thereon.

9. The energy absorption strap assembly of claim 8, wherein the rake bolt extends through the elongated slot.

10. The energy absorption strap assembly of claim 8, wherein the slot wall includes a first end slot wall portion, a second end slot wall portion and a pair of side wall portions.

11. The energy absorption strap assembly of claim 10, wherein the first end slot wall portion defines a first translation limit of an upper jacket operatively coupled to the energy absorption strap, wherein the second end slot wall portion defines a second translation limit of the upper jacket.

12. The energy absorption strap assembly of claim 8, wherein the elongated slot of the energy absorption strap is located proximate an end of the energy absorption strap.

13. The energy absorption strap assembly of claim 8, wherein the plurality of teeth are only disposed on a portion of the face.

14. The energy absorption strap assembly of claim 8, further comprising an eccentric cam selectively engageable with the plurality of teeth.

\* \* \* \* \*